June 25, 1957 J. POLYZOU 2,797,261
CARRIER TELEGRAPH RECEIVER
Filed April 22, 1954
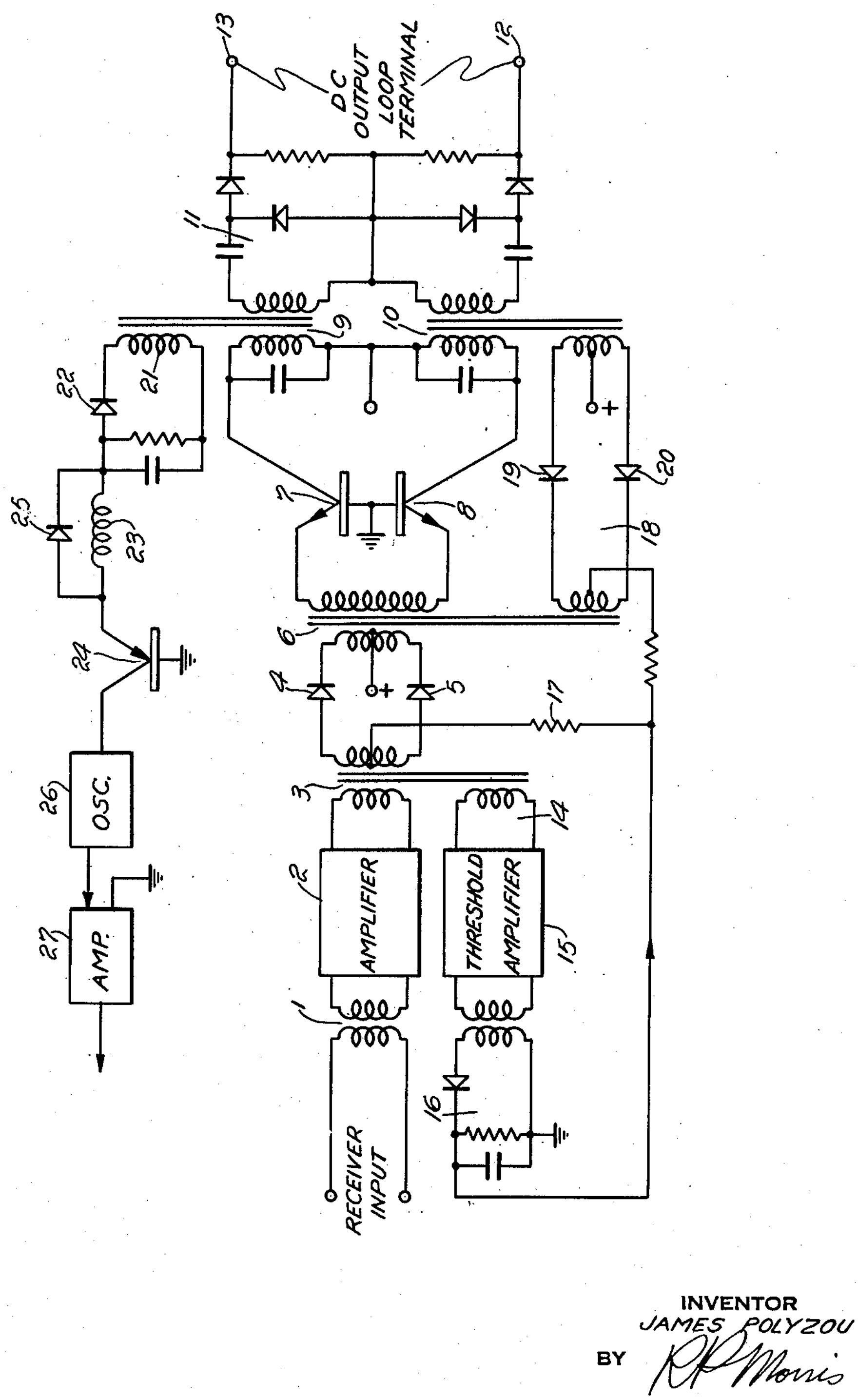
INVENTOR
JAMES POLYZOU
BY R P Morris
ATTORNEY

United States Patent Office

2,797,261

Patented June 25, 1957

2,797,261

CARRIER TELEGRAPH RECEIVER

James Polyzou, Nutley, N. J., assignor to International Telephone and Telegraph Corporation, New York, N. Y., a corporation of Maryland Application April 22, 1954, Serial No. 424,844

6 Claims. (Cl. 178—66)

This invention relates to telegraph receivers and more particularly to telegraph receivers of the voice frequency shift type.

In the typical voice frequency carrier telegraph equipment, the transmitter is keyed on and off, that is to mark and space intervals, as in the usual teleprinter send circuit. The carrier telegraph equipment converts the mark and space pulses to voice frequency signals, which may be designated as the first and second frequency, by shifting the frequency of the oscillator to a new frequency slightly displaced from the first frequency to provide different frequencies for mark and space intelligence transmission pulses. These pulses are generally of predetermined equal length. In the receiving equipment the mark and space voice frequency signals are demodulated and converted in the mark and space D. C. pulses for the operation of the relay or teleprinter equipment. In such equipment the idle condition of the teleprinter or the like is generally maintained in the mark condition by supplying thereto a continuous mark signal. This signal is continuously applied even when no intelligence energy is being received. Some type of threshold circuit is generally used for this purpose. The calling signal is usually a 20 cycle ringing frequency. When this 20 cycle ringing signal is transmitted to the telegraph receiver equipment it is converted to the second or space frequency and is transmitted as a pulse of energy materially longer in duration than the normal space intelligence pulses.

It is an object of this invention to provide a telegraph receiver equipment for operation with the voice frequency shift type of transmission in which the marking signal is maintained during period of no signal reception by means of circuit which serves to convert the receiver amplifier in the oscillator operating at this mark frequency.

In accordance with this invention there is provided a receiver for electrical energy of a first and second frequency in which the output of the receiver is maintained at the first frequency in the absence of the received signals, the receiver equipment including an amplifier for the received frequencies, the entire system being characterized by the provision of a regenerative feedback coupling for the receiver amplifier used to amplify the first frequency so that the amplifier will oscillate at this first frequency in the absence of received energy and a means coupled to the regenerative feedback circuit to render it ineffective when signals of either the first or second frequency are being received.

A further feature of the invention comprises a rectifier equipment coupled to the amplifier portion used for the space signals which rectifier equipment is of a relatively long time constant so that it will respond only to pulses of the second frequency that are of a longer duration than the normal space intelligence impulses.

The above-mentioned and other features and objects of this invention and the manner of attaining them will become more apparent and the invention itself will be best understood by reference to the following description of an embodiment of the invention taken in conjunction with the accompanying drawing, the single figure of which is a schematic diagram partly in block form illustrating this invention.

Turning now to the drawing, the received energy is applied over a transformer 1 to a limiter amplifier 2. This amplifier 2 may be, for example, a pair of cascaded transistor amplifiers which serve to amplify the energy to a predetermined level but at the same time to limit the energy so as to remove any amplitude modulations therefrom. The output energy from amplifier 2 is applied over the transformer 3 through rectifiers 4 and 5 and a second transformer 6 to a pair of amplifiers 7 and 8 connected in push-pull. The push-pull outputs of these two amplifiers are applied to separately tuned transformers 9 and 10. Amplifiers 7 and 8 are shown as transistor amplifiers, the collector electrodes of which are coupled respectively to the primaries of transformers 9 and 10. Thus energy of the first and second frequencies are selectively applied over transformers 9 and 10 to the discriminator circuit 11 where these are translated into direct current pulses with the mark pulse appearing at terminal 12 and the space pulses at terminal 13. These terminals may be connected to a teleprinter equipment or other desired output circuit.

Output energy from transformer 3 is also coupled through secondary windings 14 to the threshold amplifier 15. The output energy from threshold amplifier 15 is rectified at 16 and applied as a control voltage over line 17 to the center tap of the secondary of transformer 3 feeding into rectifiers 4 and 5. A biassing voltage of the same polarity is also applied to the center tap of the primary of transformer 6 and normally blocks rectifiers 4 and 5. Thus, in the absence of received signals, the linkage between amplifier 2 and the amplifier 7, 8 is blocked. However, upon receipt of signals the control voltage furnished by the threshold amplifier is sufficiently great to overcome the blocking bias voltage applied to rectifiers 4 and 5 so that the amplifier 2 is coupled to the remaining portion of the receiver. A linkage circuit 18 is also provided coupled between transformer 10 and transformer 6. In this linkage circuit are provided two rectifiers 19 and 20 which are arranged in the opposite direction to the rectifiers 4 and 5. A positive voltage is applied to the center tap of the input coil of the linkage circuit coupled to transformer 10 and the voltage developed from the threshold amplifier is applied to the center tap of the coil coupled to transformer 6. During the reception of signals the voltage applied to the winding coupled to transformer 6 is sufficiently high to neutralize the bias voltage so that rectifiers 19 and 20 are blocked. However, in the absence of any received signals the bias voltage renders link circuit 18 closed so that there is provided a feedback from transformer 10 to transformer 6 in a regenerative sense and, therefore, the amplifier 8 will operate as an oscillator. Since the circuit is tuned to the first or mark frequency a mark frequency signal will be continuously applied to the output circuit 11 in the absence of any applied or received signals.

When a calling or ringing signal is received this signal is applied over amplifier 2 transformers 3 and 6 and amplifier 7 to the transformer 9. A third winding 21 is connected as a further secondary to transformer 9 and receives this second or space frequency. This energy is then rectified in rectifier 22 and applied over inductance coil 23 to the amplifier 24, shown as another transistor amplifier. Coil 23 is made of relatively large inductance and the resistance to amplifier 24 is quite low so that the circuit has a relatively long time constant. A further rectifier 25 is provided bridging coil 23 so that upon collapse of the inductance field in coil 23 the voltage produced is substantially short circuited. Accordingly, only when long ringing space frequency signal is received will sufficiently high energy be produced in the output of amplifier 24 to operate the ringing oscillator 26. Ringing frequency oscillations generated in oscillator 26 may be amplified in amplifier 27 and applied to the desired signal equipment.

While the circuit described herein has been made with reference to transistor type amplifiers it is clear that the principles of this invention apply equally well to other types of amplifiers. Furthermore, it should be understood that any suitable type of rectifier may be used, the invention not being limited to the crystal type rectifiers illustrated.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A receiver for receiving electrical energy of both a first and a second frequency, comprising means for deriving an output from said receiver at said first frequency in the absence of received signals of either frequency, amplifier means coupled to said receiver, regenerative feedback means coupled between the output and input of said amplifier means, means coupled to said amplifier means for deriving a potential in response to received energy of either of said frequencies, and means for applying said potential to block said feedback means, whereby said amplifier means will oscillate at said first frequency only when said potential is applied to said feedback means.

2. A telegraph receiver according to claim 1, wherein said electrical energy comprises intelligence pulses of a predetermined length, and calling signals energy pulses of said second frequencies of a length greater than said intelligence pulses, and further comprising by a rectifier circuit coupled to the amplifier means for said second frequency, said rectifier circuit having a time constant to render it operative only in response to said calling signals, and a call circuit coupled to said rectifier circuit.

3. A receiver according to claim 1 wherein said feedback means comprises a loop having an input coupler at its end adjacent said amplifier output and an output coupler at its other end, and unidirectional conductive means in said loop, and means connected to said input coupler normally to bias said unidirectional conductive means into conductive condition, in the absence of signals, said means for applying said derived potential connected to said output coupler, to neutralize the normal bias on said unidirectional conductive means.

4. A receiver according to claim 3, further comprising a normally blocked coupling loop for applying received signals to said amplifier means, and means for connecting said potential application means to said coupling loop to unblock same in response to receipt of signal energy.

5. A receiver according to claim 4, wherein said connecting means comprises unidirectional transmitting means in said coupling loop, bias means normally biassing said transmitting means into blocked condition, and additional connecting means for connecting said potential application means to said transmitting means for neutralizing the bias thereon.

6. A receiver according to claim 1, wherein said means-for-deriving a potential comprises a threshold amplifier for amplifying received energy and a rectifier means for rectifying said received energy.

References Cited in the file of this patent

UNITED STATES PATENTS

| | | |
|---|---|---|
| 2,023,458 | Yolles | Dec. 10, 1935 |
| 2,367,378 | Schick | Jan. 16, 1945 |
| 2,462,224 | Rheams | Feb. 22, 1949 |